US008829717B2

(12) United States Patent  (10) Patent No.: US 8,829,717 B2
Kudo et al.  (45) Date of Patent: Sep. 9, 2014

(54) BATTERY CONTROL DEVICE AND BATTERY SYSTEM

(75) Inventors: Akihiko Kudo, Hitachinaka (JP); Mutsumi Kikuchi, Mito (JP); Gosuke Shibahara, Vancouver (CA); Akihiko Emori, Hitachi (JP); Yasuo Uemura, Naka (JP); Tatsumi Yamauchi, Hitachiota (JP); Kenji Kubo, Hitachi (JP); Yoshinori Aoshima, Tsukubamirai (JP)

(73) Assignee: Hitachi Vehicle Energy, Ltd., Hitachinaka-shi (JP)

( * ) Notice: Subject to any disclaimer, the term of this patent is extended or adjusted under 35 U.S.C. 154(b) by 854 days.

(21) Appl. No.: 13/020,116

(22) Filed: Feb. 3, 2011

(65) Prior Publication Data

US 2011/0193413 A1   Aug. 11, 2011

(30) Foreign Application Priority Data

Feb. 5, 2010   (JP) .................................. 2010-023919

(51) Int. Cl.
*H02J 1/00*   (2006.01)
*H02J 3/00*   (2006.01)
*H02J 7/00*   (2006.01)

(52) U.S. Cl.
CPC ............ *H02J 7/0018* (2013.01); *Y02T 10/7055* (2013.01)
USPC .............. 307/77; 320/134; 320/163; 324/434

(58) Field of Classification Search
CPC ......... H01L 22/00; H02J 7/00; Y02T 10/7055
USPC .......................................................... 307/77
See application file for complete search history.

(56) References Cited

U.S. PATENT DOCUMENTS

| 7,511,457 | B2 | 3/2009 | Emori et al. |
| 2005/0242667 | A1 | 11/2005 | Emori et al. |
| 2010/0001737 | A1 | 1/2010 | Kubo et al. |
| 2010/0244847 | A1 | 9/2010 | Kudo et al. |

FOREIGN PATENT DOCUMENTS

| CN | 101621131 A | 1/2010 |
| JP | 2005-318750 A | 11/2005 |
| JP | 2008-39443 A | 2/2008 |
| JP | 2008-118855 A | 5/2008 |

(Continued)

OTHER PUBLICATIONS

Chinese-language Office Action dated May 13, 2013 with English translation (twenty-one (21) pages).

(Continued)

*Primary Examiner* — Rexford Barnie
*Assistant Examiner* — Toan Vu
(74) *Attorney, Agent, or Firm* — Crowell & Moring LLP

(57) ABSTRACT

A battery control device for a battery module includes a plurality of integrated circuits. Each integrated circuit includes: a constant voltage circuit that lowers a total voltage of a battery cell group corresponding to the integrated circuit to an integrated circuit internal voltage; a signal generation circuit that generates, based upon a first signal provided by a higher-order control circuit, a second signal assuming a wave height value different from a wave height value of the first signal and outputs the second signal; and a startup circuit that includes a first comparator assuming a first decision-making threshold value corresponding to the first signal and a second comparator assuming a second decision-making threshold value corresponding to the second signal, and starts up the constant voltage circuit in response to a change in an output from at least either the first comparator or the second comparator.

8 Claims, 7 Drawing Sheets

(56) References Cited

FOREIGN PATENT DOCUMENTS

| | | |
|---|---|---|
| JP | 2008-141953 A | 6/2008 |
| JP | 2008-141954 A | 6/2008 |
| JP | 2008-148553 A | 6/2008 |
| JP | 2008-220074 A | 9/2008 |
| JP | 2008-295299 A | 12/2008 |
| JP | 2009-27915 A | 2/2009 |
| JP | 2009-27916 A | 2/2009 |
| JP | 2009-89484 A | 4/2009 |
| JP | 2009-89486 A | 4/2009 |
| JP | 2009-89487 A | 4/2009 |
| JP | 2009-89488 A | 4/2009 |
| JP | 2009-183025 A | 8/2009 |
| JP | 2010-16928 A | 1/2010 |
| JP | 2010-193589 A | 9/2010 |
| JP | 2010-228523 A | 10/2010 |
| JP | 2010-249793 A | 11/2010 |

OTHER PUBLICATIONS

Japanese-language Office Action dated Jul. 9, 2013 with English translation (Six (6) pages).

BATTERY CONTROL DEVICE AND BATTERY SYSTEM

INCORPORATION BY REFERENCE

The disclosure of the following priority application is herein incorporated by reference: Japanese Patent Application No. 2010-023919 filed Feb. 5, 2010

BACKGROUND OF THE INVENTION

1. Field of the Invention

The present invention relates to a battery control device that controls a battery including a plurality of battery cells. More specifically, it relates to a battery control device capable of executing optimal control for a battery installed in a vehicle equipped with an electric drive device such as an electric car, a hybrid car or an electric train and it also relates to a battery system that includes the battery control device.

2. Description of Related Art

A battery module in the related art is typically constituted by connecting a plurality of battery groups each made up with a plurality of battery cells connected in series, as disclosed in, for instance, Japanese Laid Open Patent Publication No. 2005-318750. A battery control device that controls such a battery module includes a lower-order control device that monitors the states of battery cells, provided for each of the battery groups. These lower-order control devices receive commands issued by a higher-order control device via a signal transmission path in which an insulating circuit such as a photocoupler is disposed so as to ensure that the signal transmission path remains unaffected by the potential difference between the lower-order control devices and the higher-order control device.

SUMMARY OF THE INVENTION

The body of a vehicle, such as an automobile or an electric train, is likely to be touched by human beings. Accordingly, a battery control device will be installed in the vehicle by ensuring that it is electrically insulated from the body so as to assure better safety. These measures are taken not only in vehicles but also in, for instance, industrial machines. Namely, an industrial machine itself or the housing for the industrial machine is also likely to be touched by human beings and thus, the electric power system in the battery control device will be electrically insulated from the machine, the housing or the like.

Another electric power system with a low source voltage such as a power source for a control circuit, on the other hand, does not present a safety hazard to human operators and, for this reason, the body, the housing or the like may be utilized as part of the low electric power system and the potential at the body or the housing may be designated as a reference potential.

In automotive applications, in particular, in which the body is utilized as part of a low electric power system constituting the low-voltage source system, the battery control device and the battery module are insulated from the other power source system for better safety as explained earlier. In addition, it is desirable to connect the battery module in series via a switchable connector in order to assure better safety during inspection/repair of the battery control device or in the event of a traffic accident. When the connector is opened, the DC current supplied from the battery module will be cut off and thus, better safety will be assured by adopting this structure.

As described earlier, a battery module includes a plurality of battery cells connected in series and battery modules each made up with battery cells connected in series are then connected in series via a connector. The battery control device includes a plurality of integrated circuits that function as battery cell controllers during battery cell processing such as battery cell terminal voltage measurement, battery cell diagnosis or state-of-charge control. The plurality of integrated circuits each includes a transmission circuit, and the transmission circuits in the individual integrated circuits are connected in series to one another, thereby forming a transmission path.

In addition, the battery control device is often connected to an inverter or the like which, in turn, is connected to an electric motor. The inverter or the like connected with the battery control device tends to generate large noise at an operation start, during operation and at an operation stop. Since this noise is applied to the battery cells, the integrated circuits connected to the battery cells, too, are bound to be affected by the noise, resulting in erroneous operation. Accordingly, a control device achieving a high level of reliability, which does not allow any erroneous operation to occur due to noise, is highly desirable.

According to the 1st aspect of the present invention, a battery control device for a battery module including a plurality of battery cell groups connected in series each made up with a plurality of battery cells connected in series, comprises: a plurality of integrated circuits each of which is provided in correspondence to one of the plurality of battery cell groups, and executes control processing and monitor processing for each of the battery cells in the one of the battery cell groups; a first transmission path connecting the plurality of integrated circuits in series, through which a signal is transmitted among the integrated circuits; a second transmission path through which a first signal, including a startup signal or a command signal output from a higher-order control circuit that controls the plurality of integrated circuits, is transmitted via a first insulating circuit to a highest-order integrated circuit among the plurality of integrated circuits connected in series; and a third transmission path through which a signal sent from a lowest-order integrated circuit among the plurality of integrated circuits connected in series to the higher-order control circuit, is transmitted via a second insulating circuit. And each integrated circuit among the plurality of integrated circuits comprises: a constant voltage circuit that lowers a total voltage of a battery cell group corresponding to the integrated circuit to an integrated circuit internal voltage; a signal generation circuit that generates, based upon the first signal provided by the higher-order control circuit, a second signal assuming a wave height value different from a wave height value of the first signal and outputs the second signal; and a startup circuit that includes a first comparator assuming a first decision-making threshold value corresponding to the first signal and a second comparator assuming a second decision-making threshold value corresponding to the second signal, and starts up the constant voltage circuit in response to a change in an output from at least either the first comparator or the second comparator.

According to the 2nd aspect of the present invention, in the battery control device according to the 1st aspect, it is preferred that the startup circuit outputs the startup signal to the constant voltage circuit and also causes the startup signal to be output as the first signal from the integrated circuit.

According to the 3rd aspect of the present invention, in the battery control device according to the 1st or the 2nd aspect, it is preferred that the signal generation circuit generates the second signal by using as a drive voltage a potential difference manifested by the integrated circuit internal voltage relative to a ground potential at the integrated circuit in which the signal generation circuit is located.

According to the 4th aspect of the present invention, in the battery control device according to the 3rd aspect, it is preferred that: the first decision-making threshold value is set to a value between the total voltage of the integrated circuit that includes the first comparator and the ground potential at the integrated circuit; and the second decision-making threshold value is set to a value between the total voltage of the integrated circuit that includes the second comparator and a voltage representing a sum of the total voltage and the integrated circuit internal voltage.

According to the 5th aspect of the present invention, in the battery control device according to any one of the 1st through the 4th aspects, it is preferred that if outputs from the first comparator and the second comparator remain unchanged over a predetermined length of time or longer following a startup, operation at the integrated circuit stops except for operation of the startup circuit.

According to the 6th aspect of the present invention, in the battery control device according to any one of the 1st through the 5th aspects, it is preferred that the integrated circuit internal voltage is used to power a circuit that executes the control processing and the monitor processing.

According to the 7th aspect of the present invention, a battery system comprises: a battery module including a plurality of battery cell groups connected in series each made up with a plurality of battery cells connected in series; a battery control device according to any one of the 1st through the 6th aspects; and a higher-order control device that controls a plurality of integrated circuits in the battery control device.

DESCRIPTION OF PREFERRED EMBODIMENTS

Figure 1:
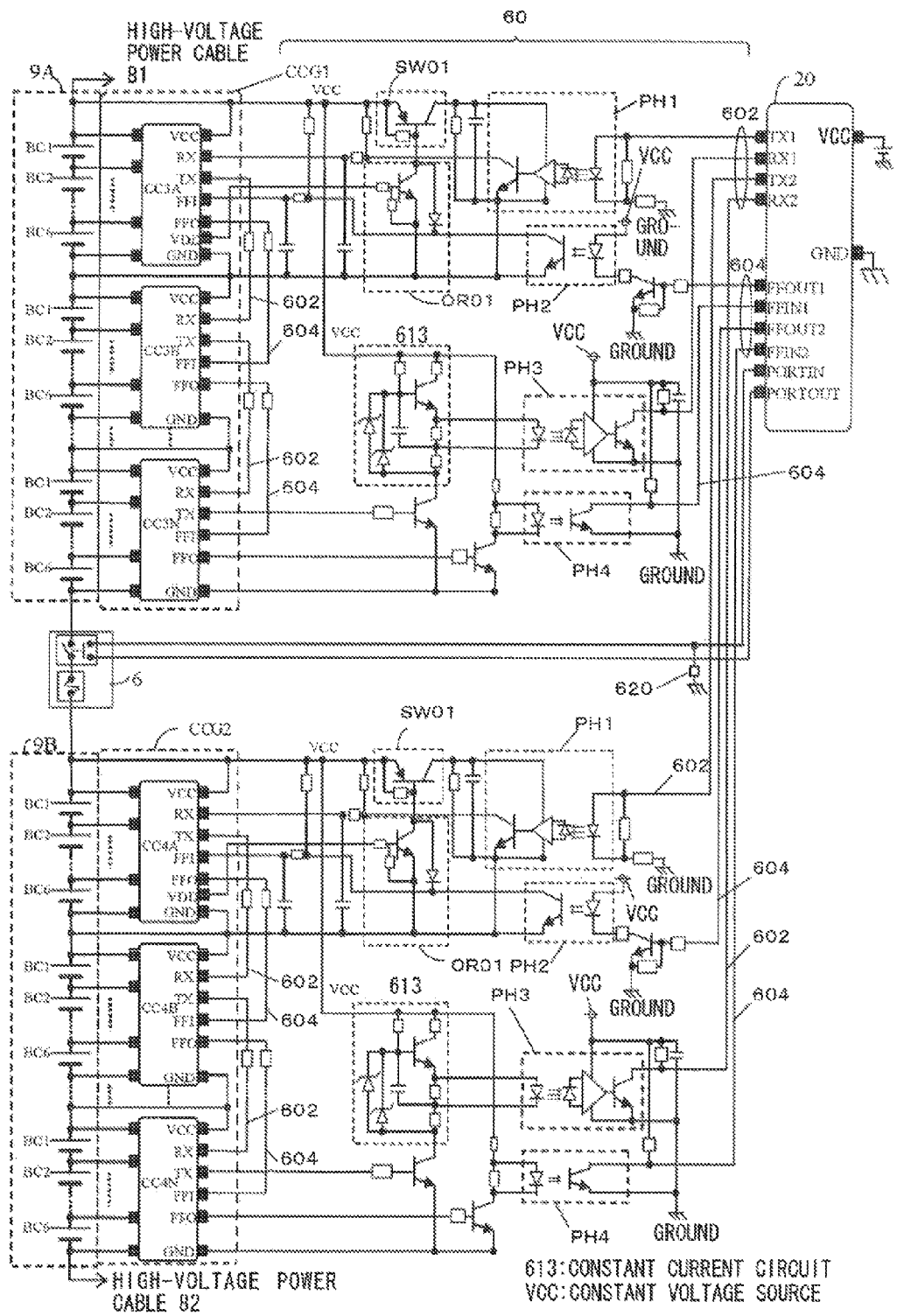
FIG. 1 shows the battery control device achieved in an embodiment.
Figure 2:
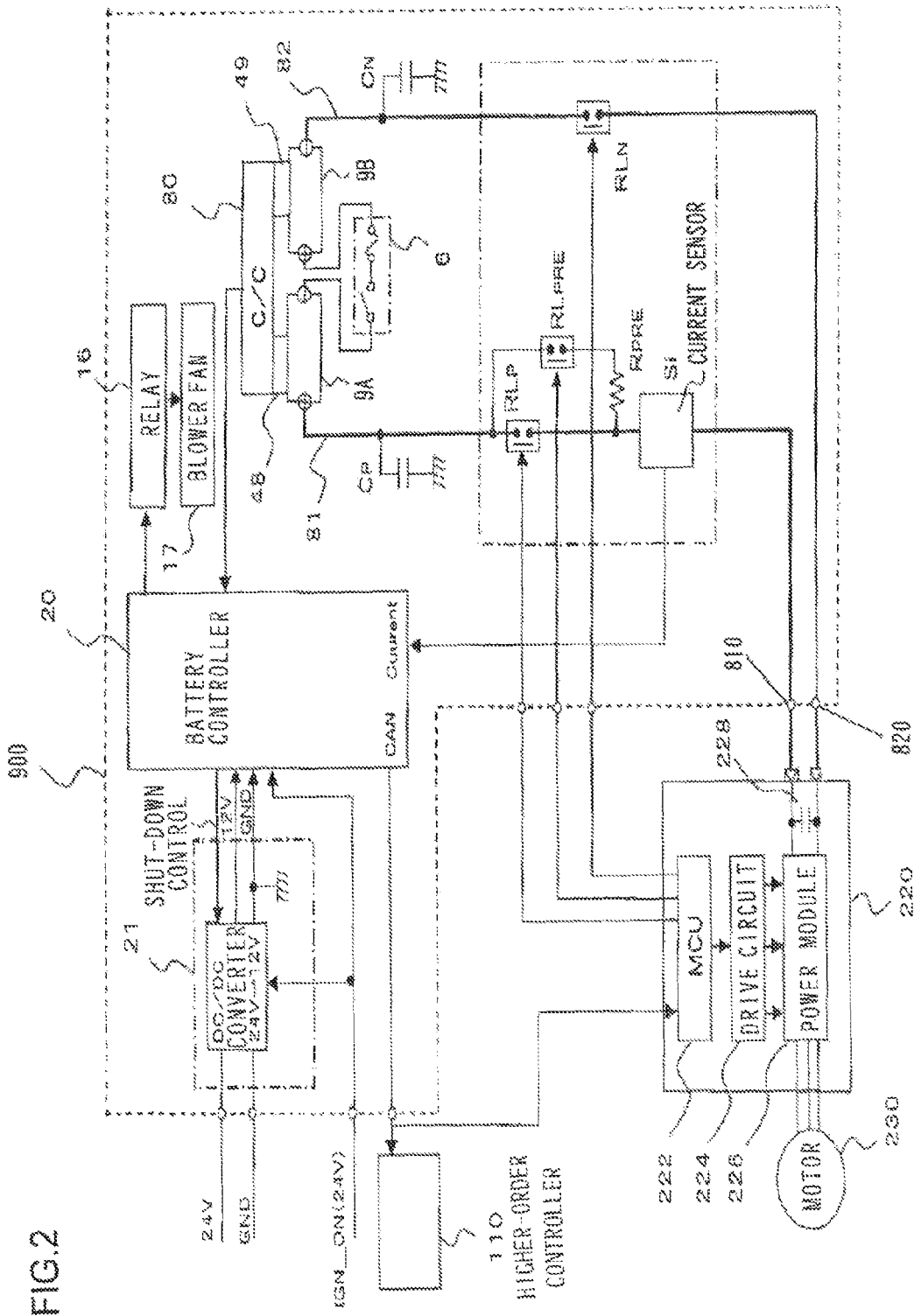
FIG. 2 shows the drive control device for a rotating electrical machine for a vehicle equipped with the battery control device shown in FIG. 1.

The following is a description of the best mode for carrying out the present invention, given in reference to the drawings. FIGS. 1 and 2 are illustrations pertaining to an embodiment of the battery control device according to the present invention. FIG 1 shows the essential structure of the battery control device, whereas FIG. 2 shows the drive control device for a rotating electrical machine for a vehicle equipped with the battery control device. The drive control device for the rotating electrical machine for a vehicle in FIG. 2 is first described.

While the vehicle in this instance would ideally be an automobile, desirable advantages will also be achieved by adopting the present invention in an electric train. It may also be adopted in an industrial machine. However, the following description is given by assuming that the present invention is adopted in an automobile.

FIG. 2 is a circuit diagram pertaining to an application in which the battery control device achieved in the embodiment is adopted in the drive control device for a rotating electrical machine for a vehicle. The drive control device comprises a battery unit (battery system) 900 that includes the battery control device, an inverter device 220 that converts DC power from the battery unit 900 to three-phase AC power, a vehicle drive motor 230 and a higher-order controller 110 that controls the battery unit 900 and the inverter device 220. The motor 230 is driven with the three-phase AC power provided from the inverter device 220.

The battery unit 900 includes two battery modules 9A and 9B, a cell controller 80 and a battery controller 20. The battery module 9A and the battery module 9B are connected in series via a switch 6. The switch 6, constituted by serially connecting a switch and a fuse, functions as a service disconnect for maintenance/inspection. As the switch 6 opens, the direct circuit in the electrical circuit becomes disconnected, and thus, even if a connecting circuit should he formed at a point somewhere in the battery module 9A or 9B and the vehicle, no current will flow. This structure assures a high level of safety.

The battery module 9A is constituted by connecting a plurality of battery cell groups each made up with a plurality of battery cells connected in series. The battery module 9B assumes a similar structure. A positive electrode of the battery module 9A is connected to the positive electrode of the inverter device 220 via a positive-electrode high-voltage power (power eclectics) cable 81 and a relay RLP. A negative electrode of the battery module 9B is connected to the negative electrode of the inverter device 220 via a negative-electrode high-voltage power cable 82 and a relay RLN. In addition, a serial circuit formed by connecting in series a resistor RPRE and a precharge relay RLPRE is connected in parallel to the relay RLP. A current sensor Si, such as a Hall element, is inserted between the relay RLP and the inverter device 220. The output line from the current sensor Si, installed within a junction box is led to the battery controller 20.

The relay RLP and the relay RLN may each be constituted with a relay having a rated current of approximately 80 A, whereas the precharge relay RLPRE may be constituted with a relay having a rated current of approximately 10 A. In addition, the resistor RPRE may be constituted with a resistor having a rated capacity of 60 W and a resistance value of approximately 50 Ω, whereas the current sensor Si may have a rated current of approximately ±200A. The negative electrode high-voltage power cable 82 and the positive electrode high-voltage power cable 81 mentioned earlier are connected to the inverter device 220 that drives the motor 239 respectively via the relay RLN and an output terminal 820 and via the relay RLP and an output terminal 810. Such a structure assures a high level of safety.

The inverter device 220 includes a power module 226, an MCU 222, a driver circuit 224 with which the power module 226 is driven and a smoothing capacitor 228 with a large capacity in an approximate range of 700 μF to 2000 μF. The power module 226 converts DC power supplied from the power modules 9A and 9B to three-phase AC power to be used to drive the motor 230.

When starting drive of the motor 230, the MCU 222, following instructions issued by the higher-order controller 110, switches the negative-electrode side relay RLN from the open state to the closed state and then switches the precharge relay RLPRE from the open state to the closed state so as to charge the smoothing capacitor 228, and subsequently switches the positive-electrode side relay RLP from the open state to the closed state so as to start power supply from the battery modules 9A and 9B in the battery unit 900 to the inverter device 220.

It is to be noted that the inverter device 220 in a hybrid vehicle application engages the motor 230 in operation as a generator, i.e., executes regenerative braking control during a braking operation, by controlling the phase of the AC power generated in the power module 226 with regard to the rotor in the motor 230 and re-generates the power generated through the generator operation at the battery modules 9A and 9B, thereby charging the battery modules 9A and 9B. In correspondence to the states of charge at the battery modules 9A and 9B, the inverter device 220 allows the motor 230 to operate as an electric generator. Three-phase AC power generated at the motor 230 is converted to DC power via the power module 226 and the DC power is then provided to the battery modules 9A and 9B. The battery modules 9A and 9B are thus charged with the DC power.

When running the motor 230 in power-running operation, the MCU 222 controls the switching operation at the power module 226 by controlling the driver circuit 224 under instructions issued by the higher-order controller 110. As a result, a rotating magnetic field with the phase thereof controlled relative to the rotation of the rotor in the motor 230 is generated and DC power is supplied from the battery modules 9A and 9B to the power module 226.

When the inverter device 220 starts operation, substantially no electrical charge is stored in the smoothing capacitor 228, and then, as the relay RLP is closed, a large initial current starts flowing into the smoothing capacitor 228. This large current may cause fusion of the negative-electrode side main relay RLN and the positive-electrode side main relay RLP, resulting in damage to the relays. In order to eliminate this risk, the MCU 222 first switches the negative-electrode side relay RLN from the open state to the closed state and then holds the positive-electrode side relay RLP in the open state while it charges the smoothing capacitor 228 mentioned earlier by switching the precharge relay RLPRE from the open state to the closed state and thus regulating the maximum current via the resistor RPRE.

Once the smoothing capacitor 228 is charged to achieve a predetermined voltage, the initial state is cleared. In other words, once the initial charge of the smoothing capacitor 228 via the precharge relay RLPRE and the resistor RPRE is completed, both the negative-electrode side relay RLN and the positive-electrode side relay RLP are switched to the closed state to supply DC power from the power source system 1 to the power module 228. Through this control, a high level of safety can be maintained as the relay circuit is reliably protected and the maximum current that may flow through the lithium battery cells and the inverter device 220 is lowered to a level equal to or less than a predetermined value.

Capacitors CN and CP are inserted respectively in the line connecting the negative electrode of the battery module 9B and the negative-electrode side relay RLN and the line connecting the positive electrode of the battery module 9A and the positive-electrode side relay RLP in the battery unit 900 so as to take up positions between the connector lines and the case ground (which assumes a potential equal to that of the vehicle chassis). The capacitors CN and CP remove noise generated by the inverter device 220 and thus prevent erroneous operation of the low-voltage power system circuit.

It is to be noted that the high capacity electric power system circuit in the battery unit 900 is indicated by the bold lines in FIG. 2. The wires indicated by the bold lines are rectangular copper wires with a large sectional area. In addition, a blower fan 17, installed as a cooling fan for the battery modules 9A and 9B, is engaged in operation via a relay 16, which is turned on in response to a command issued by the battery controller 20.

(Transmission Path)

The communication transmission path extending between the cell controller 80 and the battery controller 20, which functions as the higher-order control circuit, both shown in FIG. 2, is described in detail now. It is to be noted that the cell controller 80 in FIG. 2 is constituted with a plurality of integrated circuits CC3A, CC3B . . . CC3N, CC4A, CC4B . . . CC4N shown in FIG. 1 and that the integrated circuits CC3A to CC4N will be referred to as battery cell controllers CC3A to CC4N in this description.

FIG. 1 shows the battery modules 9A and 9B, the battery cell controllers CC3A to CC4N, transmission paths 60 and the battery controller 20. As explained earlier, the battery module 9A and the battery module 9B are connected in series via the switch 6. The positive-electrode side of the battery module 9A is connected to the high-voltage power cable 81, whereas the negative-electrode side of the battery module 9B is connected to the high-voltage power cable 82.

The battery cell controllers CC3A, CC3B . . . CC3N are disposed each in correspondence to one of the battery cell groups constituting the battery module 9A, whereas the battery cell controllers CC4A, CC4B . . . CC4N are disposed each in correspondence to one of the battery cell groups constituting the battery module 913. Namely, a battery cell controller group CCG1 made up with the battery cell controllers CC3A, CC3B . . . CC3N is installed in the battery module 9A, whereas a battery cell controller group CCG2 made up with the battery cell controllers CC4A, CC4B . . . CC4N is installed in the battery module 9B.

While other battery cell controllers assuming similar structures are present between the battery cell controller CC3B and the battery cell controller CC3N and between the battery cell controller CC4B and the battery cell controller CC4N, FIG. 1 does not show them so as to simplify the illustration. In addition, the battery module 9A, the battery cell controller group CCG1 and the transmission path 60 shown on the top side of FIG. 1 respectively are structurally identical to the battery module 9B, the battery cell controller group CCG2 and the transmission path shown on the bottom side of the figure. The following detailed description is given in reference to the structural features of the components shown on the upper side of the figure, which arc pertinent to the battery module 9A.

Signals are exchanged between the battery controller 20 and the individual battery cell controllers CC3A, CC3B . . . CC3N through the transmission path 60, which includes a signal harness. The battery cell controllers CC3A, CC3B . . . CC3N are connected in series via transmission paths 602 and 604. A command signal transmitted from a transmission terminal TX1 of the battery controller 20 is delivered via a loop communication path to the battery cell controllers CC3A, CC3B . . . CC3N, and data corresponding to the command are transmitted through the loop communication path made up with the battery cell controllers CC3A, CC3B . . . CC3N and are received at a reception terminal RX1 of the battery controller 20.

Namely, the command signal transmitted from the transmission terminal TX1 of the battery controller 20 travels through the transmission path 60 and is received at a reception terminal RX of the battery cell controller CC3A. Data or a command corresponding to the command signal is then transmitted from a transmission terminal TX of the battery cell controller CC3A. The command signal received at the reception terminal RX of the battery cell controller CC3B is then transmitted from a transmission terminal TX of the battery cell controller CC3B. Through this sequential reception/transmission, a transmission signal, transmitted from a transmission terminal TX of the battery cell controller CC3N, is received at the reception terminal RX1 of the battery controller 20. Serial communication is thus achieved via the loop communication path. In response to the command signal having been received, the battery cell controllers CC3A, CC3B . . . CC3N each start executing terminal voltage detection for battery cells BC1 to BC6 constituting the corresponding battery cell group, diagnosis for the battery cells BC1 to BC6 and the like. Data collected or detected by the individual battery cell controllers in response to the command signal are then transmitted to the battery controller 20 through serial communication, as explained earlier.

The battery cell controllers CC3A, CC3B . . . CC3N each further executes abnormality diagnosis and transmit a 1-bit signal via the transmission path 604 upon determining that an abnormality exists. If any of the battery cell controllers CC3A. CC3B . . . CC3N judges that an abnormal condition exists in the corresponding battery cell group itself or receives a signal indicating an abnormal condition (abnormality signal) transmitted from the preceding battery cell controller at its reception terminal FFI1, the battery cell controller transmits an abnormality signal from its transmission terminal FFO. If, on the other hand, an abnormality signal having been sent to the reception terminal FFI1 stops coming or a diagnostic decision that an abnormal condition exists in the corresponding battery cell group switches to a diagnostic decision indicating a normal condition, the abnormality signal transmitted from the transmission terminal FFO1 is switched to a normal signal.

While the battery controller 20 does not transmit an abnormality signal to the integrated circuits under normal circumstances, it does transmit a pseudo abnormality signal to be used as a test signal in a diagnosis executed to ensure that the abnormality signal transmission paths are operational, from a transmission terminal FFOUT1 of the battery controller 20. The pseudo abnormality signal to be used as the test signal is transmitted from the transmission terminal FFOUT1 of the battery controller 20 to the reception terminal FFI of the battery cell controller CC3A via the transmission path 604. The battery cell controller CC3A having received the test signal then transmits the test signal from its transmission terminal FFO to the reception terminal FFI of the next battery cell controller CC3B. The test signal is thus sequentially transmitted to the subsequent battery cell controllers, and finally, the test signal is transmitted from the transmission terminal FFO of the battery cell controller CC3N to a reception terminal FFIN1 of the battery controller 20 via the transmission path 604.

The battery controller 20 operates on a voltage at, for instance, 5 V, generated at a low-voltage power source, with the potential relative to the chassis of the vehicle set as the ground (GND). A power source system constituted with lithium battery cells, on the other hand, is a system electrically insulated from the low-voltage power source, and battery cell controllers CC3A, CC3B . . . CC3N in this embodiment each operate on a voltage supplied thereto, which is equivalent to the potential difference between the highest potential and the lowest potential in the corresponding battery cell group.

Thus, relationships among potentials assumed in the power source system for the battery controller 20 and the power source system for the cell controller 80 are different from each other and the voltages supplied from the power source systems take on values greatly different from each other. For this reason, an insulating circuit, constituted with the photocouplers PH 1~PH 4 that will electrically insulate the two controllers from each other, is installed in the transmission path 60 connecting the battery controller 20 and the cell controller 80, so as to assure better reliability. It is to be noted that the photocoupler PH 1 and the photocoupler PH 2 in FIG. 1 are identical to each other and that the photocoupler PH 3 and the photocoupler PH 4 in FIG. 1 are also identical to each other.

The battery cells in the entire battery module 9A are used as a power source for the photocouplers PH 3 and PH 4 via which signals are transmitted from the battery cell controller group CCG1 to the battery controller 20, with a voltage VCC from the whole battery module 9A applied to the photocouplers PH 3 and PH 4. An electrical current achieving a significant level needs to flow through a photocoupler to enable high-speed communication. In the embodiment, the photocouplers PH 3 and PH 4 are driven with the whole voltage from the battery module 9A and power is supplied to the photocouplers PH 3 and PH 4 from all the battery cells in the battery module 9A. As a result, since all the battery cells are evenly sourced for the electric power to be used for the signal transmission, the extent of inconsistency in the electrical charge level among the individual battery cells in the battery module 9A is minimized.

It is to be noted that while the voltage representing the sum of the voltages from all the battery cell groups in the battery module 9A is applied to the photocouplers PH 3 and PH 4 in the embodiment, electric power may be supplied from some of the battery cell groups instead of all the battery cell groups, instead. In the latter case, the extent of inconsistency in the electrical charge level among the battery cells in the sourced battery cell groups can be minimized. For instance, the voltage between a GND terminal at the battery cell controller group CC3N and a VCC terminal at the battery cell controller group CC3B may be applied to the photocouplers PH 3 and PH 4, instead.

In addition, the photocoupler PH 3 is driven via a constant current circuit 613. As described earlier, an electrical current achieving a significant level needs to flow through the photocoupler PH 3 engaged in data transmission, and the significant electrical current needs to be constant in order to assure a satisfactory service life under these conditions. If the electrical current flowing through the photocoupler PH 3 is not adequate, an insufficient quantity of light will be emitted at the LED of the photocoupler PH 3, resulting in a lower output and lowered signal transmission reliability, whereas if an excessively large current flows through the photocoupler PH 3, the service life of the photocoupler PH 3 will be shortened. In addition, if the voltage in the battery module 9A fluctuates, the current flowing through the photocoupler PH 3, too, will change, resulting in problems such as those described above.

Accordingly, the constant current circuit 613 is disposed so as to ensure that a constant current is supplied to the photocoupler PH 3 regardless of the voltage level. The presence of the constant current circuit 613 described above ensures that the signal transmission reliability is not compromised and that the photocoupler service life is not reduced. Moreover, the level of the electrical current flowing through a photocoupler is determined by a resistor connected to the photocoupler and thus, different electrical currents will flow to the battery module 9A and the battery module 9B if there is a voltage difference, to result in varying levels of power consumption. However, since the battery module 9A and the battery module 9B each include the constant current circuit 613, so as to equalize the currents supplied to the photocouplers PH 3 in the battery modules 9A and 9B, uniformity is achieved with regard to the power used for the signal transmission in the two modules.

The power to be used to drive the light-receiving element output circuits of the photocouplers PH 1 and PH 2, which receive signals from the battery controller 20, is provided by the battery cell group corresponding to the battery cell controller CC3A. A switch SW0 1 is disposed in the transmission path extending between the photocoupler PH 1 used for data reception and the battery cell controller CC3A, and the voltage on which the photocoupler PH 1 operates is supplied via the switch SW01. An OR circuit OR01 is disposed on the base side of the switch SW01, and the switch SW01 is engaged in operation when a signal is transmitted from the flag transmission terminal FFOUT 1 of the battery controller 20 or when an internal voltage VDD is generated at the battery cell controller CC3A.

A significant quiescent current flows through the photocoupler PH 1 used for data reception when it is in a standby state, and wasteful power consumption attributable to this quiescent current is an issue to be addressed. Accordingly, whenever the cell controller 80 is in a sleep state and the transmission path is not in use, the switch SW01 is turned off via the or circuit OR01 so as to stop the power supply to the photocoupler PH 1. Consequently, wasteful power consumption is prevented.

When starting operation at the battery cell controller groups OCG1 and OCG2, a start signal is output through the flag transmission terminal FFOUT1 and a flag transmission terminal FFOUT2 of the battery controller 20. In response to the start signal, the photocouplers PH 2 are driven, and the switches SW01 are set to the ON state via the OR circuits OR01, thereby enabling the light-receiving element circuits of the photocouplers PH 1. Subsequently, the battery controller 20 outputs a transmission signal containing data or instructions through its transmission terminal TX1. The transmission signal is input to the reception terminal RX of the battery cell controller CC3A via the photocoupler PH 1 and the battery cell controller CC3A is thus engaged in operation. As the battery cell controller CC3A starts operation, a voltage VDD, to be described in detail later, is output through a terminal VDD of the battery cell controller CC3A, thereby causing a flow of a basic current through the switch SW01 and thus sustaining power supply to the photocoupler PH 1.

The battery module 9A and the battery module 9B are detachably connected to each other via the switch 6 as explained earlier. The outer case of the battery unit 900 mentioned earlier does not open unless the lock achieved with the switch 6 is released. Once the lock at the switch 6 is released, an electrical switching circuit present between the battery module 9A and the battery module 9B connected in series opens, thereby causing an open/closed sensing switch for the switch 6 to indicate the open state.

A pulse signal output through a terminal PORTOUT of the battery controller 20 will be input through a terminal PORTIN as long as the open/closed sensing switch at the switch 6 indicates the closed state. However, the transmission of the pulse signal will be cut off if the switch 6 is in an open state and the open/closed sensing switch continues to indicate the open state. The wire connecting the terminal PORTIN with the open/closed sensing switch is connected to the ground via a resistor 620, and for this reason, the potential input at the terminal PORTIN is held at the ground potential while the pulse signal transmission is cut off.

The battery controller 20 detects the open/closed state of the open/closed sensing switch at the switch 6 based upon the input potential at the terminal PORTIN. Upon detecting that the switch 6 is in the open state, the battery controller 20 informs the relevant control device, e.g., the inverter device 220, that the switch 6 is in the open state to ensure that control is executed so as to maintain safety for the overall system. For instance, when the switch 6 is in the open state, charging of the battery modules 9A and 9B by the inverter device 220 may be disallowed. It is to be noted that while the explanation has been given on the structural features related to the battery module 9A, similar structural features are assumed in relation to the transmission path 60 in the battery module 9B adopting a similar structure.

(Battery Cell Controllers)

Figure 3:
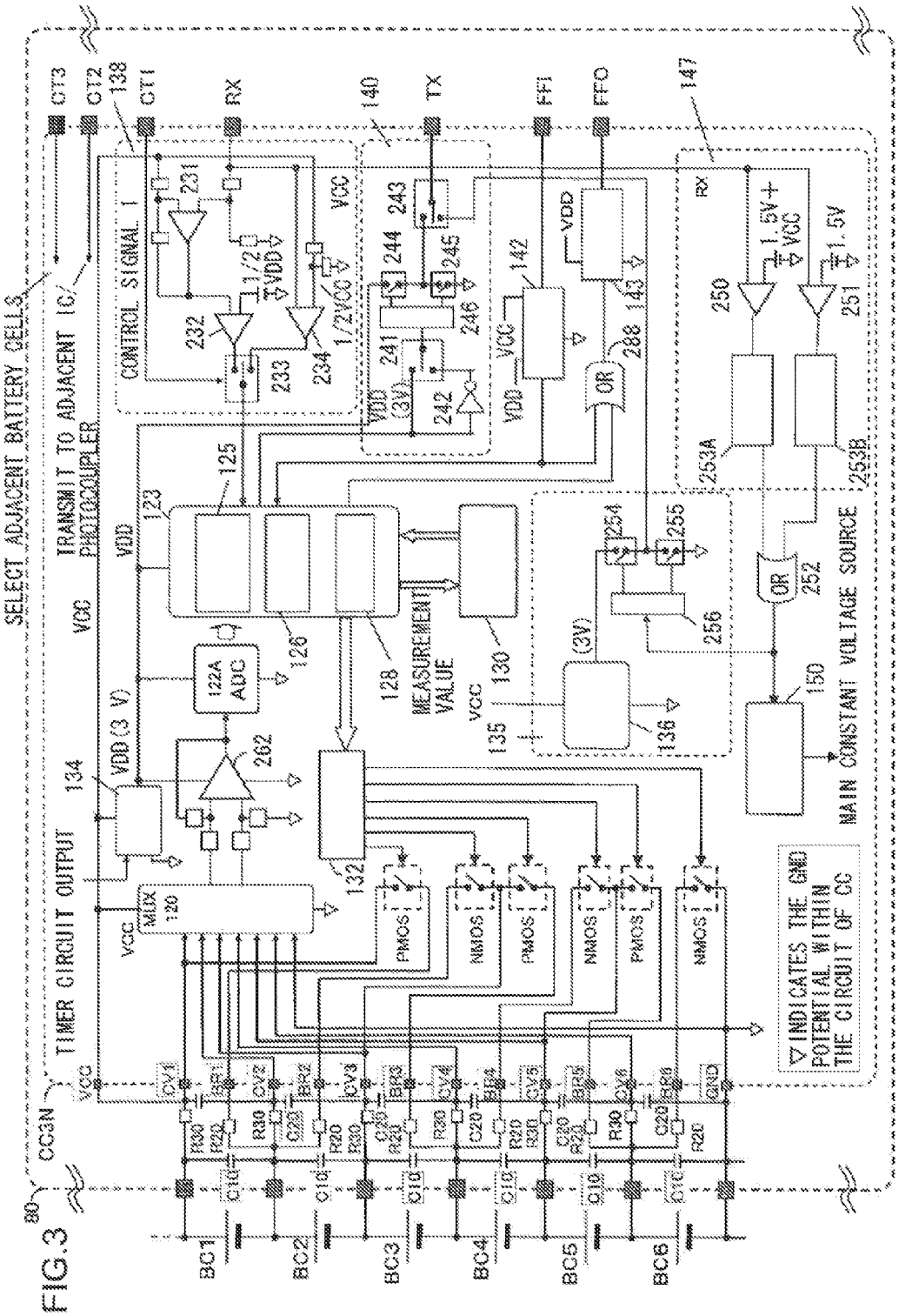
FIG. 3 illustrates the internal structure assumed in the battery cell controller CC3N.

FIG. 3 shows the internal structure assumed in the battery cell controller CC3N constituted with an integrated circuit. It is to be noted that the other battery cell controllers adopt structures similar to this and the following explanation focuses on the battery cell controller CC3N as a representative example. Terminal voltages at the lithium battery cells BC1 to BC6 are input to a multiplexer 120 via terminals CV1 to CV6. The multiplexer 120 selects a terminal among the terminals CV1 to CV6 and inputs the corresponding voltage to a differential amplifier 262. An output from the differential amplifier 262 is converted to a digital value at an analog/digital converter 122A. The terminal voltage having been converted to the digital value is provided to an IC control circuit 123 where it is held in a internal data holding circuit 125. The terminal voltages are used for diagnostic purposes or are transmitted to the battery controller 20 shown in FIG. 1. The individual lithium battery cell terminal voltages input to the terminals CV1 to CV6 will have been biased with a potential generated based upon the terminal voltages at the lithium battery cells connected in series, relative to the ground potential at the battery cell controller constituted with an integrated circuit. This bias potential is eliminated via the differential amplifier 262 and analog values indicating the terminal voltages at the individual lithium battery cells are input to the analog/digital converter 122A.

The IC control circuit 123, capable of arithmetic operation, includes the data holding circuit 125, a timing control circuit 126 that cyclically detects various voltages and executes status diagnosis; and a diagnostic flag holding circuit 128 at which a diagnostic flag provided by a diagnostic circuit 130 is set. The diagnostic circuit 130 executes various types of diagnoses, such as an overcharge diagnosis and an over-discharge diagnosis, based upon measurement values provided by the IC control circuit 123. The data holding circuit 125, which may be constituted with, for instance, a register circuit, stores the terminal voltages at the individual battery cells BC1 to BC6 having been detected, each in correspondence to a specific battery cell among the battery cells BC1 to BC6 and also holds other detection values at predetermined addresses so as to allow them to be read out subsequently.

While the description is given on the particular battery cell controller CC3N as a typical example, all the battery cell controllers each include balancing semiconductor switches (NMOS switches and PMOS switches) installed in order to adjust the levels of electrical charge (also referred to as the states of charge) at the individual lithium battery cells BC1 to BC6 constituting the corresponding lithium battery cell group. For instance, the level of charge at the battery cell BC1 is adjusted via a PMOS switch disposed between the terminal CV1 and a terminal BR1. Likewise, an NMOS switch, via which the level of charge at the battery cell BC2 is adjusted, is disposed between a terminal BR2 and the terminal CV3, a PMOS switch, via which the level of charge at a battery cell BC3 is adjusted, is disposed between the terminal CV3 and a terminal BR3, an NMOS switch, via which the level of charge at the battery cell BC4 is adjusted, is disposed between a terminal BR4 and the terminal CV5, a PMOS switch, via which the level of charge at the battery cell BC5 is adjusted, is disposed between the terminal CV5 and a terminal BR5, and an NMOS switch, via which the level of charge at the battery cell BC6 is adjusted, is disposed between a terminal BR6 and a terminal GND.

Switch-overs at these balancing semiconductor switches are controlled by a discharge control circuit 132. A command signal issued by the IC control circuit 123 to achieve electrical continuity at a specific balancing semiconductor switch corresponding to the battery cell to be discharged, is provided to the discharge control circuit 132. Upon receiving a discharge command corresponding to any battery cell among the battery cells BC1 to BC6, issued by the battery controller 20 in FIG. 1, the IC control circuit 123 executes the discharge operation described above.

When charging the battery module 9A or 9B, an electrical current originating from an electrical load is supplied to the entire array of numerous battery cells connected in series. If the numerous battery cells connected in series are in varying states of charge, the electrical current supplied to the electrical load will be restricted by the condition of the battery cell in the most advanced state of discharge among the numerous battery cells. When an electric current is supplied from the electrical load, on the other hand, the current supply is restricted in correspondence to the condition of the battery cell in the most advanced state of charge among the numerous battery cells.

For this reason, the balancing semiconductor switches connected to a plurality of battery cells that are in states of charge exceeding, for instance, an average state among the numerous battery cells connected in series, are set in an electrically continuous state and then, a discharge current is supplied via resistors R30 and R20 connected in series. Through these measures, the plurality of battery cells connected in series are controlled toward uniform states of charge. As an alternative, the battery cell in the most advanced state of discharge may be designated as a reference cell and the length of discharging time may be determined based upon the difference between the state of charge at the reference cell and the state of charge at the subject cell. There are various other methods that may be adopted when adjusting the states of charge. The state of charge in a given battery cell can be determined through arithmetic operation executed based upon the terminal voltage at the battery cell. Since the state of charge in the battery cell and the terminal voltage at the particular battery cell are correlated, the states of charge in the individual battery cells can be adjusted for uniformity by controlling the balancing semiconductor switches so as to substantially equalize the terminal voltages at the various battery cells.

(Source Voltage VCC and Source Voltage VDD)

At least two types of source voltages VCC and VDD (3 v) are used in the internal circuits of the battery cell controller CC3N. In the example presented in FIG. 3, the voltage VCC is the total voltage of the entire battery cell group constituted with the battery cells BC1 to BC6 connected in series, whereas the voltage VDD is generated in a main constant voltage source 134 and a startup constant voltage source 136 in a startup output circuit 135. The multiplexer 120 and transmission input circuits 138 and 142, through which signals are transmitted, all operate on the high-voltage VCC. The analog/digital converter 122A, the IC control circuit 123, the diagnostic circuit 130 and transmission output circuits 140 and 143, through which signals are transmitted, on the other hand, all operate on the low-voltage VDD (3 v).

(Signal Waveforms)

Figure 4:
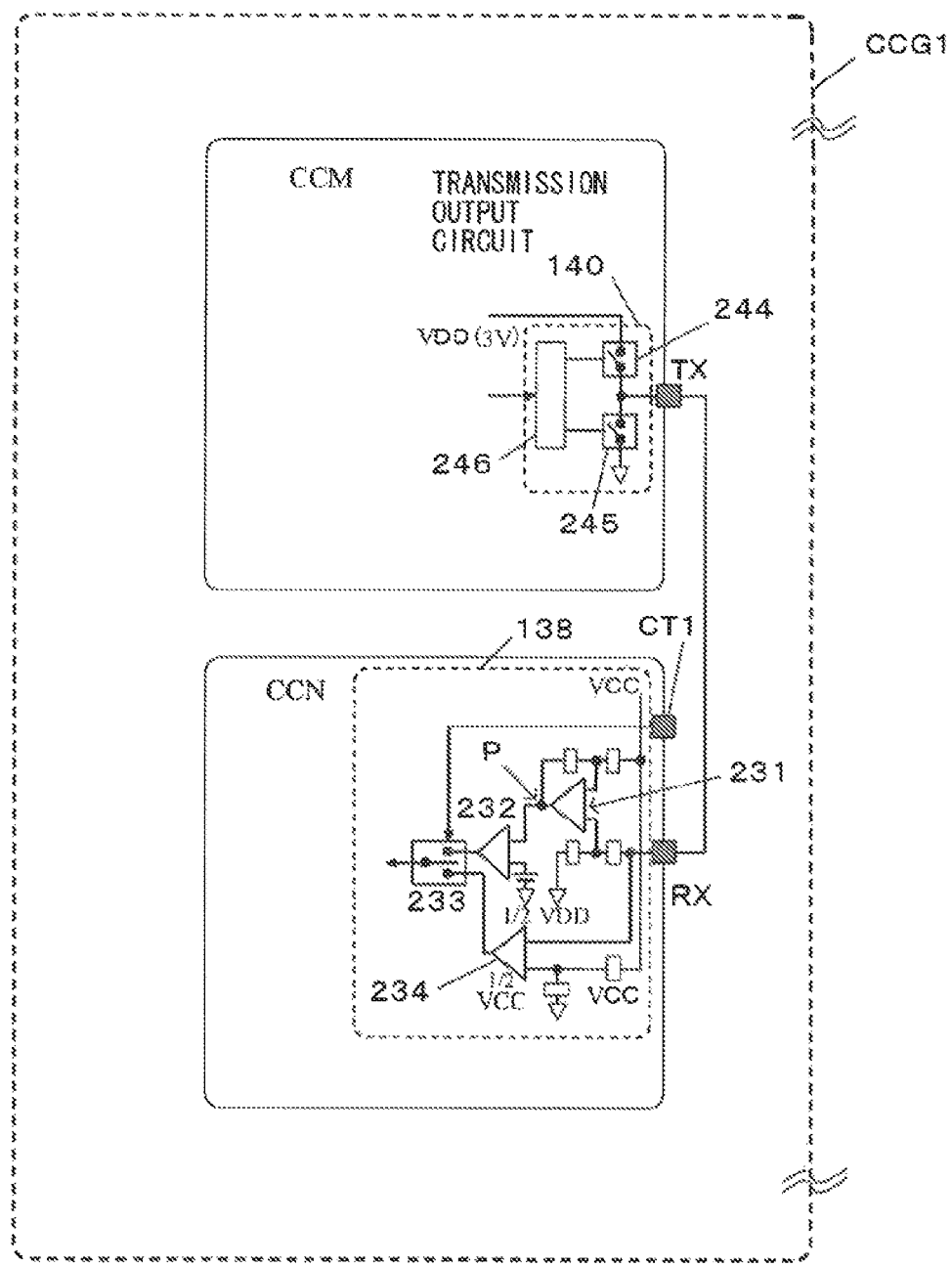
FIG. 4 shows the transmission output circuit 140 at the sender-side battery cell controller CCM and the transmission input circuit 138 at the receiver-side battery cell controller CCN.
Figure 5:
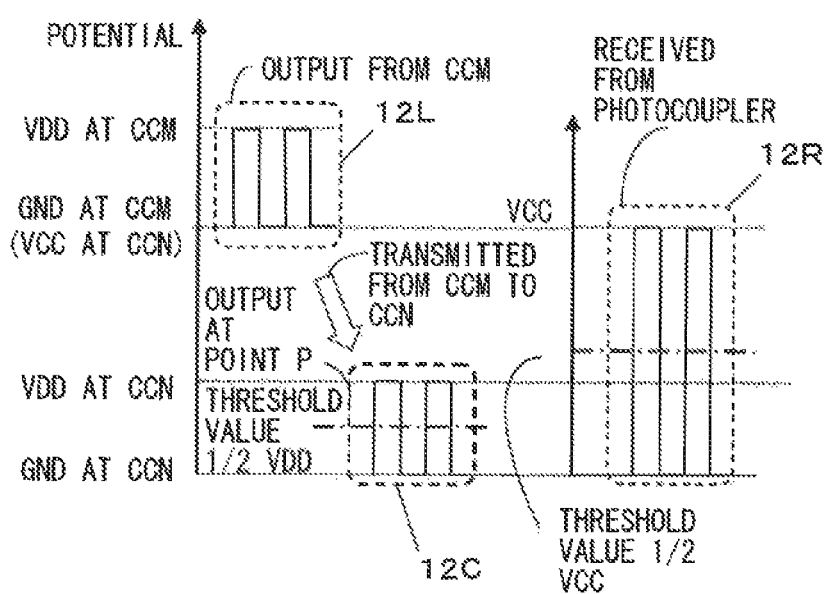
FIG. 5 shows signal waveforms.

FIGS. 4 and 5 provide diagrams in reference to which the relationship between the drive voltage used to drive the transmission output circuit 140 and the wave height value indicating the height of the signal wave at the signal recipient is to be explained. FIG. 4 shows the transmission output circuit 140 at a sender-side battery cell controller CCM and the transmission input circuit 138 at a receiver-side battery cell controller CCN. It is to be noted that FIG. 4, unlike FIG. 3, which shows the entire transmission output circuit 140, only shows part of the transmission output circuit 140. FIG. 5 indicates signal waveforms.

As shown in FIG. 4, the transmission output circuit 140 outputs a signal 12L with a waveform shown at the upper left in FIG. 5, through its transmission terminal TX by controlling switch-overs at switches 244 and 245 via a control circuit 246. As shown in FIG. 1, the terminal GND (ground) of a higher-order battery cell controller assuming a higher-order position along the transmission direction is connected to a terminal VCC of the battery cell controller assuming the immediately lower-order position along the transmission direction. Thus, the transmission output circuit 140 outputs the signal 12L with an amplitude matching the voltage VDD in reference to the ground of the battery cell controller CCM, i.e., in reference to VCC in the battery cell controller CCN. As the switch 245 is opened and the switch 244 is closed, a high-level signal (with a potential representing the sum VCC+VDD) is output, whereas as the switch 245 is closed and the switch 244 is opened, a low-level signal (with a potential VCC) is output (see the waveform of 12L on the left side in FIG. 5).

The signal output through the transmission terminal TX of the battery cell controller CCM is first input to the reception terminal RX of the battery cell controller CCN taking up the immediately lower-order position along the transmission direction and then is input to a differential amplifier 231 in the transmission input circuit 138. The differential amplifier 231 outputs a signal corresponding to the difference between the signal from the battery cell controller CCM input thereto and the voltage VCC in the battery cell controller CCN. A signal 12C shown at the center of FIG. 5 is the signal output from the differential amplifier 231 (the signal at a point P in FIG. 4). The low level of the signal 12C matches the ground level at the battery cell controller CCN, whereas the high level of the signal 12C matches the potential equivalent to the sum of the ground level and VDD. The signal 12C output from the differential amplifier 231 is compared with a threshold value VDD/2 at a comparator 232 and a [1] signal or a [0] signal is thus generated.

Each battery cell controller includes a circuit 231 that receives a signal from an adjacent battery cell controller and a circuit 234 that receives a signal from a photocoupler. Either of these circuits, selected via a switching member 233 based upon a control signal applied to a control terminal CT1 shown in FIG. 3, is engaged in operation. If the battery cell controller CCN is the cell controller taking the highest-order position along the transmission direction in the battery cell controller group CCG1, i.e., if a signal from the photocoupler PH 1 is input to the reception terminal RX of the battery cell controller CCN, a lower-side contact point in the switching member 233 closes and the output signal from the comparator 234 is output from the transmission input circuit 138. If, on the other hand, a signal from an adjacent battery cell controller is input to the reception terminal RX of the battery cell controller CCN, an upper-side contact point in the switching member 233 closes and the output signal from the comparator 232 is output from the transmission input circuit 138. In the example presented in FIG. 4, a signal from the adjacent battery cell controller CCM is input to the transmission input circuit 138 in the battery cell controller CCN and thus, the upper-side contact point in the switching member 233 closes.

When the battery cell controller CCN is the battery cell controller taking the highest-order position, a signal 12R on the right side in FIG. 5 from the photocoupler PH 1 is input to its reception terminal RX. The high level of this input signal matches the potential VCC in reference to the ground level of the battery cell controller. The comparator 234 compares the signal from the photocoupler PH 1 input to the reception terminal RX with a threshold value VCC/2 and outputs a [1] signal or a [0] signal, It is to be noted that since the transmission input circuit 142 and the transmission output circuit 143 in FIG. 3 assume circuit structures similar to those of the transmission input circuit 138 and the transmission output circuit 140 described above and signals are transmitted between terminals FFIN (FFI) and terminals FFOUT (FFO) as described above, a repeated explanation is not provided.

(Control Terminals CT1 to CT3)

The battery cell controller CC3N in FIG. 3 includes control terminals CT2 and CT3 via which operations are switched, in addition to the control terminal CT1 mentioned earlier. As explained above, a selection as to whether a transmission signal is to be received from the photocoupler PH 1 or PH 2 or a transmission signal from the adjacent battery cell controller is to be received, is made via the control terminal CT1. The waveforms of the photocoupler output and the outputs through the terminal TX and the terminal FFO at the adjacent battery cell controller assume wave height values different from each other, and accordingly, different threshold values must be used in decision making. Accordingly, the switching member 233 in the transmission input circuit 138 is switched based upon the control signal at the control terminal CT1. The switch-over at the switching member 233 occurs as explained earlier. It is to be noted that in order to minimize the current consumption in a non-operating state, the terminal voltage at the control terminal is not detected in the non-operating state. Although it appears as though the terminal voltage were detected at all times in order to simplify the illustration, once the state of the terminal is detected at startup, the detected state is held while the operation is executed.

When outputting signals through the transmission terminals TX and FFOUT, a selection as to whether the signals are to be provided to the adjacent battery cell controller or to photocouplers is made via the control terminal CT2. As indicated in FIG. 1, in the lowest order IC, i.e., CC3N or CC4N, the photocouplers PH3 and PH4 are driven by controlling the transistors with the outputs through the transmission terminals TX and FFOUT. The logic of this operation, holding H as long as the photocoupler remains on, is different from the transmission logic with which a signal is transmitted to the adjacent IC. The control terminal CT2, via which these logics are switched, is installed so as to ensure that the photocouplers are not engaged in operation when the operation of the battery cell controller ceases.

At a startup of the battery control device structured as shown in FIG. 1, the highest-order integrated circuit (battery cell controller CC3A) having received a startup signal from the control circuit (battery controller 20) through the photocoupler PH1 starts up and transmits the startup signal to the next integrated circuit (battery cell controller CC3B) by directing the signal to the next integrated circuit directly without going through any photocoupler. Since this operation is repeatedly executed in the integrated circuit (battery cell controllers CC3A to CC3N) connected in series, all the integrated circuits connected in series are eventually started up and enter an operation enabled state. It is to be noted that as the last integrated circuit (battery cell controller CC3N) in the serial connection transmits the startup signal to the control circuit (battery controller 20) through the photocoupler PH3, the control circuit (battery controller 20) is able to confirm that all the integrated circuits (battery cell controllers CC3A to CC3N) have been started up and subsequently, is able to communicate with all the integrated circuits.

In this situation, since the level of the startup signal used to start up the highest-order battery cell controller CC3A and the level of the received signal input through the input terminal at the highest-order battery cell controller CC3A must be equal to or lower than the source voltage in the battery cell controller CC3A, a threshold value taking a value between the value representing the total voltage corresponding to all the battery cells connected to the battery cell controller CC3A and the value representing the GND voltage is set (see the signal 12R in FIG. 5). In addition, the threshold value for the transmission signal output level will take on a value between the value representing the source voltage of the battery cell controller CC3A and the value representing the GND voltage.

As described earlier, the input level at each battery cell controller except for the highest-order battery cell controller, which is connected to the battery cell controller taking the immediately higher-order position without using an insulating element, falls into a voltage range representing the sum of the source voltage at the particular battery cell controller and the level of the transmission signal at the battery cell controller taking the immediately higher-order Position. For this reason, the highest-order battery cell controller, which alone assumes different startup and reception signal voltage levels, needs to be constituted with a battery cell controller with an input voltage level different from that of the other battery cell controllers, or with a battery cell controller capable of automatically recognizing itself as the highest-order battery cell controller. Since the battery control device requires numerous battery cell controllers identical to one another, it is desirable to use battery cell controllers constituted with identical integrated circuits each capable of automatically recognizing itself as highest-order cell controller.

The battery cell controllers in the embodiment each include the control terminal CT1 described earlier, via which a selection as to whether to receive a transmission signal from the photocoupler PH1 or PH2 or from the adjacent battery cell controller is made. The switching member 233 in the transmission input circuit 138 is switched based upon a control signal at the control terminal CT1. It is to be noted that startup signal processing is executed in a startup input circuit 147 in FIG. 3 as described below, independently of the processing of the control signal at the control circuit CT1.

As the constant voltage VDD (3 v) is output from the main constant voltage source 134 in FIG. 3, the battery cell controller CC3N, having been in a sleep state, shifts into a rising operational state. In reference to FIG. 6, which shows the startup input circuit 147, a timer circuit 150 and the main constant voltage source 134 and FIG. 7, which shows signals output from the circuits shown in FIG. 6, an operation stop and an operation start at the main constant voltage source 134 are described next.

As the startup input circuit 147 receives a signal having been transmitted from the adjacent battery cell controller or from the photocoupler, the timer circuit 150 is engaged in operation and the voltage VCC is supplied to the main constant voltage source 134. In response, the main constant voltage source 134 enters an operating state and a constant voltage VDD is output from a constant voltage generation circuit 153.

Figure 7:
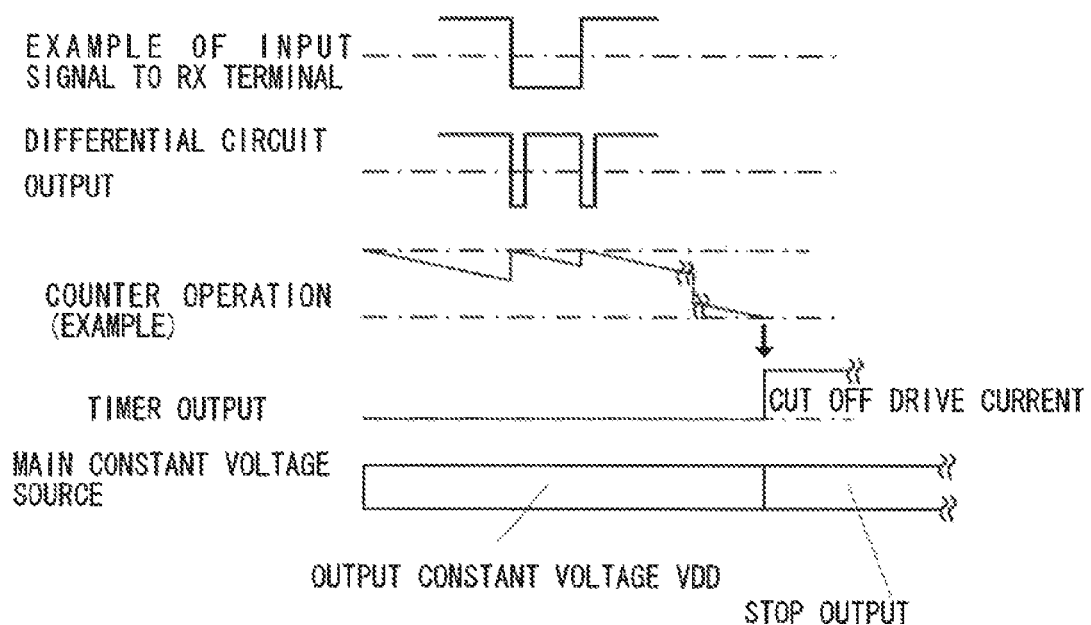
FIG. 7 shows the signal input to the reception terminal RX, the output from the differential trigger circuit 253, the operational state of the counter, the output from the timer circuit 150 and the operational state of the main constant voltage source 134 in FIG. 6.

Since any signal received at the reception terminal RX inevitably assumes either high level or low level (potential level), a signal level shift is detected with a differential trigger circuit 253 constituted with, for instance, a capacitor and a trigger signal is transmitted to the timer circuit 150. If no trigger signal is input to the timer circuit 150 over a predetermined length of time, e.g., over a 10-second period, it stops the drive output, thereby stopping the operation of the main constant voltage source 134. The timer circuit 150, which may be constituted with, for instance, a preset-type down counter 152 has its count value set each time the trigger signal is input thereto. As the value at the timer circuit is counted down to a predetermined value (e.g., 0), the timer circuit 150 stops the signal output, thereby cutting off the supply of the VCC voltage to the constant voltage generation circuit 153, as shown in FIG. 7.

As a startup signal is output through the transmission terminal FFOUT at the battery controller 20 in FIG. 1, i.e., the higher-order control device, the switch SW01 enters an electrically continuous state and thus, power is supplied to the photocoupler PH1 via which a TX signal is transmitted. As a result, the signal is transmitted to the reception terminal RX of the highest-order battery cell controller CC3A and the transmitted signal is then input to the startup input circuit 147 via the reception terminal RX.

A comparator 250 assuming a threshold value of VCC+1.5V and a comparator 251 assuming a threshold value of 1.5V are connected to the input of the startup input circuit 147. The comparator 250 is also connected to a differential trigger circuit 253A, whereas the comparator 251 is connected to a differential trigger circuit 253B. An or circuit 252 is connected to the output of the startup input circuit 147. As a result, a signal is output through the output through the output of the or circuit 252 every time the input signal exceeds or becomes below the threshold value VCC+1.5V and the threshold value 1.5V.

Based upon the results output from the startup input circuit 147, the OR circuit 252 outputs a [0]/[1] signal to the timer circuit 150 and a startup output circuit 135, as shown in FIG. 3. The startup output circuit 135 in FIG. 3 includes a startup constant voltage source 136 that outputs a voltage 3 v, switches 254 and 255 connected to the startup constant voltage source 136, and a control circuit 256 that controls switchovers at the switches 254 and 255. The startup output circuit 135 converts a signal provided by the startup input circuit 147 to a signal with an amplitude 3 v and passes the signal resulting from the conversion to a switching member 243 in the transmission output circuit 140. A switch-over occurs at the switching member 243 in correspondence to the current state, i.e., whether a startup is yet to occur or a startup has already occurred, and its lower-side contact point is closed prior to startup. For this reason, the signal provided from the startup output circuit 135 is transmitted through the transmission terminal TX to the reception terminal RX of the next battery cell controller.

In the embodiment described above, a battery cell controller having received a startup signal through its reception terminal RX, provides the startup signal to the reception terminal RX of the next battery cell controller via its startup output circuit 135, independently of the buildup operation (startup operation) executed in the particular battery cell controller. As a result, an advantage is achieved in that the operation of the overall system can start sooner compared to the timing of an operation start in a system in which the signal is provided to the next battery cell controller only after a given battery cell controller has risen to full operation.

In addition, two different threshold values are set in conjunction with the startup input circuit 147, i.e., a threshold value used when the corresponding battery cell controller is disposed at the highest-order position and a threshold value used when the corresponding battery cell controller is at a position other than the highest-order position, and any shift in the input signal can be detected via the differential trigger circuit 253A or 253B, by comparing the input signal to either of these threshold values.

Battery cell controllers (integrated circuits) in cell controllers in the related art may each include an input level decision-making comparator and a state-holding circuit for an input signal such as those shown in FIG. 5, disposed both at the startup signal terminal and the reception terminal thereof. In such a case, the subject integrated circuit is determined to be either the integrated circuit connected at the highest-order portion or an integrated circuit other than the highest-order integrated circuit via the input-level decision-making comparator and the state thus determined is held in a state-holding circuit.

Namely, a comparator assuming a threshold value higher than the source voltage and a comparator assuming a threshold value lower than the source voltage are connected to the startup and reception terminals. Upon detecting that the input level is lower than the source voltage, the corresponding integrated circuit is recognized as the integrated circuit connected at the highest-order position and the state thus recognized is held, whereas upon detecting that the input level is higher than the source image, the integrated circuit is recognized as an integrated circuit connected at a position other than the highest-order position and the state thus recognized is held. More specifically, within the integrated circuit, a set of a startup detection circuit and a reception detection circuit, assuming a threshold value lower than the source voltage, and a set of a startup detection circuit and a reception detection circuit, assuming a threshold value higher than the source voltage, are connected in parallel, and a selection as to which set or startup detection circuit and reception detection circuit is to be validated is made based upon the state that is currently held.

In the related art, the startup threshold value set for the startup terminal of the integrated circuit connected at the highest-order position is lower than the value representing the source voltage of the integrated circuit, and a communication signal assumes a level between the source voltage and the GND voltage during operation. Thus, the comparator installed to enable the automatic recognition described earlier is engaged in operation to detect that the particular integrated circuit is the highest-order integrated circuit and the detected state is held. Since this state is continuously held even after the operation stops, the startup comparator is still valid when the integrated circuit having stopped its operation is restarted and, as a result, the integrated circuit is started up in a normal manner in response to an input of a startup signal with a level lower than the source voltage.

In addition, the startup threshold value set for the startup terminal of the integrated circuit connected at a position other than the highest-order position is higher than the value representing the source voltage of the integrated circuit, and a communication signal assumes a level between the source voltage and a value indicating a voltage higher than the source voltage during operation. The comparator installed to enable the automatic recognition described earlier is thus engaged in operation to detect that the particular integrated circuit is an integrated circuit other than the highest-order integrated circuit and the detected state is held. Since this state is continuously held even after the operation stops, the startup comparator is still valid when the integrated circuit having stopped its operation is restarted and, as a result, the integrated circuit starts up in a normal manner in response to an input of a startup signal assuming a level falling within a range between the source voltage and the threshold value indicating a voltage higher than the source voltage.

However, if a voltage higher than the source voltage is applied to the startup terminal in the highest-order integrated circuit for some reason, e.g., excessive noise at operation stop, the comparator installed for purposes of automatic recognition in the integrated circuit is engaged in operation and the integrated circuit is recognized as an integrated circuit that is not connected at the highest-order position. Under such circumstances, even when the noise dissipates and the voltage at the startup terminal is again held at the level equivalent to the source voltage Of the integrated circuit, the integrated circuit, still recognized as a lower order integrated circuit, will continue to operate by erroneously judging that the startup signal has been continuously applied to the integrated circuit. As a result, the startup signal will also be sequentially applied to the lower order integrated circuits connected in series, thereby setting all the integrated circuits in the startup state, in which the operation cannot be stopped. In this condition, the current consumption in the integrated circuits will cause the battery to discharge. If such a state is sustained over an extended period of time, the battery will become overdischarged and become unusable.

Figure 6:
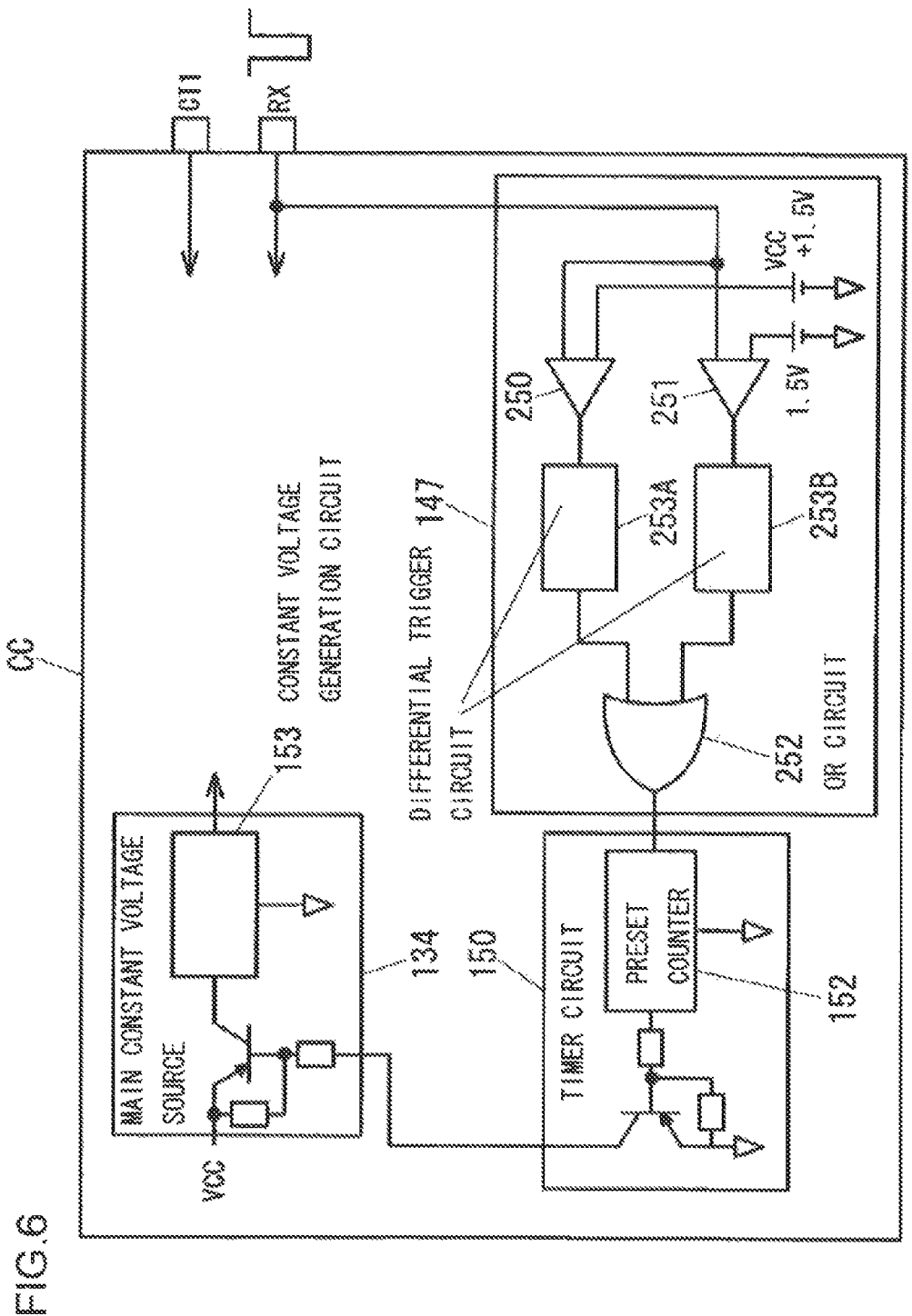
FIG. 6 shows the startup input circuit 147, the timer circuit 150 and the main constant voltage source 134.

This problem may be avoided by adopting a structure similar to, for instance, the structure of the transmission input circuit 138 shown in FIG. 4, instead of the structure shown in FIG. 6, for the startup input circuit 147, so as to detect the state of the integrated circuit by using either threshold value based upon the control signal at the control terminal CT1 and prevent a condition under which the operation cannot be stopped that may occur when the comparator installed for purposes of the automatic recognition described above is used. However, if the highest order setting/adjacent IC setting is erroneously recognized at the control terminal CT1 due to, for instance, noise or the like during the state detection, the integrated circuit may not start up.

For instance, if the integrated circuit connected at the highest-order position is erroneously recognized as an integrated circuit with an adjacent IC setting, a signal in a 0 to VCC range will be input even though the threshold value assumed at the startup input circuit 147 is VCC+1.5 v and thus, the integrated circuit will not be able to start up. If on the other hand, an integrated circuit connected as an adjacent IC is erroneously recognized as the integrated circuit at the highest-order integrated circuit, a signal within a VCC to (VCC+3 v) range will be input although the threshold value assumed for the startup input circuit 147 is 1.5 v and, as a result, the integrated circuit will not be able to start up.

In contrast, the structure shown in FIG. 6 allows the integrated circuit to be started up with a high level of reliability even when the highest order setting/adjacent IC setting is erroneously recognized at the control terminal CT1 due to noise or the like, since a signal is output from the OR circuit 252 to the timer circuit 150 upon detecting either of the two threshold values. In other words, the reliability of the battery control device can be improved.

The embodiments described above may be adopted singularly or in combination to realize a singular advantage or a combination of synergistically achieved advantages. In addition, as long as the features characterizing the present invention are not compromised, the present invention is not limited to any of the specific structural particulars described in reference to the embodiments.

What is claimed is:

1. A battery control device for a battery module including a plurality of battery cell groups connected in series each made up with a plurality of battery cells connected in series, comprising:

a plurality of integrated circuits each of which is provided in correspondence to one of the plurality of battery cell groups, and executes control processing and monitor processing for each of the battery cells in the one of the battery cell groups;

a first transmission path connecting the plurality of integrated circuits in series, through which a signal is transmitted among the integrated circuits;

a second transmission path through which a signal output from a higher-order control circuit that controls the plurality of integrated circuits, is transmitted via a first insulating circuit to a highest-order integrated circuit among the plurality of integrated circuits connected in series; and a third transmission path through which a signal sent from a lowest-order integrated circuit among the plurality of integrated circuits connected in series to the higher-order control circuit, is transmitted via a second insulating circuit, wherein each integrated circuit among the plurality of integrated circuits comprises:

a constant voltage circuit that lowers a total voltage of a battery cell group corresponding to the integrated circuit to an integrated circuit internal voltage;

a signal generation circuit that, when a first startup signal is inputted through the second transmission path and via the first insulating circuit from the higher-order control circuit, generates, a second startup signal assuming a wave height value different from a wave height value of the first startup signal and outputs the second startup signal to the first transmission path, and that, when the second startup signal is inputted through the first transmission path from a higher-order integrated circuit, outputs the second startup signal to the first transmission path or the third transmission path; and a first startup circuit that includes a first comparator which compares a first decision-making threshold value corresponding to the first startup signal with the inputted first startup signal or the inputted second startup signal and changes an output thereof according to a result of comparison, and a first trigger circuit that outputs a first trigger signal based on a change of the output of the first comparator;

a second startup circuit that includes a second comparator which compares a second decision-making threshold value corresponding to the second startup signal with the inputted first startup signal or the inputted second startup signal and changes an output thereof according to a result of comparison, and a second trigger circuit that outputs a second trigger signal based on a change of the output of the second comparator; and an OR circuit that outputs a signal to start up, the constant voltage circuit when at least one of the first trigger signal and the second trigger signal is outputted.

2. A battery control device according to claim 1, wherein:

in the integrated circuit, the signal from the OR circuit is outputted to the constant voltage circuit and also the second startup signal is outputted from the signal generation circuit based on the signal from the OR circuit.

3. A battery control device according to claim 1, wherein:

the signal generation circuit includes a startup constant voltage circuit that lowers the total voltage of the battery cell group corresponding to the integrated circuit, in which the signal generation circuit is located, to the integrated circuit internal voltage, and generates the second signal by using the integrated circuit internal voltage generated by the startup constant voltage circuit.

4. A battery control device according to claim 3, wherein:

the first decision-making threshold value is set to a value between the total voltage of the integrated circuit that includes the first comparator and the ground potential at the integrated circuit; and the second decision-making threshold value is set to a value between the total voltage of the integrated circuit that includes the second comparator and a voltage representing a sum of the total voltage and the integrated circuit internal voltage.

5. A battery control device according to claim 1, wherein:

in the integrated circuit, if outputs from both the first comparator and the second comparator remain unchanged over a predetermined length of time or longer following a startup, operation of the constant voltage circuit stops.

6. A battery control device according to claim 1, wherein:

the integrated circuit internal voltage is used to power a circuit that executes the control processing and the monitor processing.

7. A battery system, comprising:

a battery module including a plurality of battery cell groups connected in series each made up with a plurality of battery cells connected in series;

a battery control device according to claim 1; and a higher-order control device that controls a plurality of integrated circuits in the battery control device.

8. A battery control device for a battery module including a plurality of battery cell groups connected in series each made up with a plurality of battery cells connected in series, comprising:

a plurality of integrated circuits each of which is provided in correspondence to one of the plurality of battery cell groups, and executes control processing and monitor processing for each of the battery cells in the one of the battery cell groups;

a first transmission path connecting the plurality of integrated circuits in series, through which a signal is transmitted among the integrated circuits;

a second transmission path through which a first signal, including a startup signal or a command signal output from a higher-order control circuit that controls the plurality of integrated circuits, is transmitted via a first insulating circuit to a highest-order integrated circuit among the plurality of integrated circuits connected in series; and a third transmission path through which a signal sent from a lowest-order integrated circuit among the plurality of integrated circuits connected in series to the higher-order control circuit, is transmitted via a second insulating circuit, wherein each integrated circuit among the plurality of integrated circuits comprises:

a constant voltage circuit that lowers a total voltage of a battery cell group corresponding to the integrated circuit to an integrated circuit internal voltage;

a signal generation circuit that generates, based upon the first signal provided by the higher-order control circuit, a second signal assuming a wave height value different from a wave height value of the first signal and outputs the second signal; and a startup circuit that includes a first comparator assuming a first decision-making threshold value corresponding to the first signal and a second comparator assuming a second decision-making threshold value corresponding to the second signal, and starts up the constant voltage circuit in response to a change in an output from at least either the first comparator or the second comparator, wherein:

the signal generation circuit generates the second signal by using as a drive voltage a potential difference manifested by the integrated circuit internal voltage relative to a ground potential at the integrated circuit in which the signal generation circuit is located;

the first decision-making threshold value is set to a value between the total voltage of the integrated circuit that includes the first comparator and the ground potential at the integrated circuit; and the second decision-making threshold value is set to a value between the total voltage of the integrated circuit that includes the second comparator and a voltage representing a sum of the total voltage and the integrated circuit internal voltage.

* * * * *